Patented Apr. 30, 1935

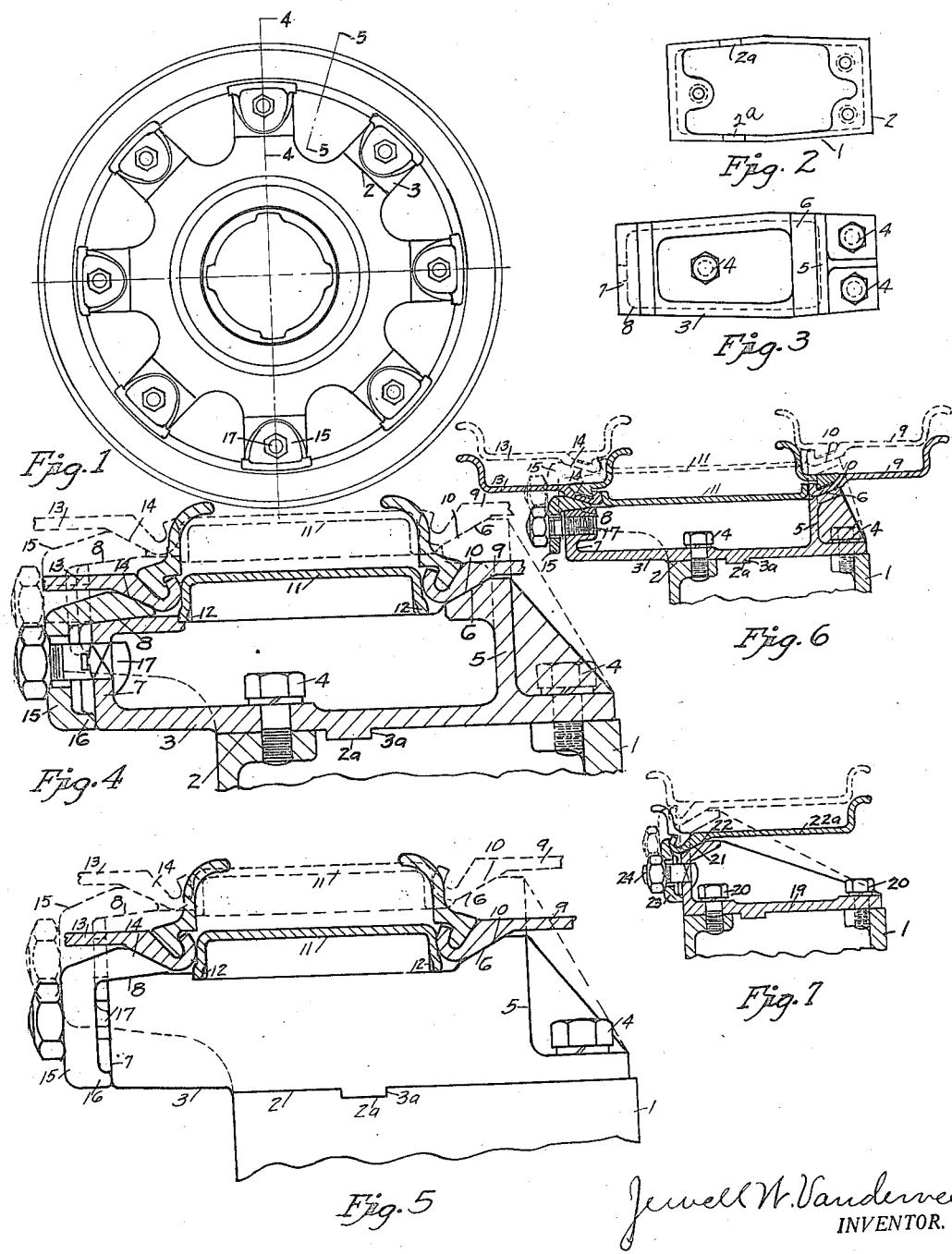

1,999,531

UNITED STATES PATENT OFFICE 1,999,531

WHEEL

Jewell W. Vanderveer, Syracuse, N. Y., assignor to Erie Malleable Iron Company, Erie, Pa., a corporation of Pennsylvania Application December 26, 1930, Serial No. 504,849

8 Claims. (Cl. 301—12)

In the manufacture of vehicles, particularly trucks, a variety of wheels are generally used with each model. This requires a large supply of wheels not only at the truck plant, but in many instances at the point of ultimate sale, or delivery inasmuch as the views of the purchaser and the particular use to which he wishes it to be put control very largely the type of wheel. In some instances larger tires are desired and in other instances a similar diameter of tire, but smaller cross section is desired and where these changes are made an entirely different wheel is required for each change. Further different rims require different details of mounting and with the ordinary wheel a change of form of rim requires a complete change of wheel and where the type of rim is optional requires a supply of wheels not only capable of taking care of different sizes of tires, but also capable of taking different types of rims. The present invention is designed to obviate the difficulty with relation to these numerous sizes by providing a uniform wheel center and securing thereto spokes of different sizes to take care of the different tire arrangements that may be desired. In this way it is only necessary for the manufacturer, or ultimate dealer, to have these various spokes which are comparatively small parts to adapt the truck wheels to any size desired. Further this enables a truck owner at a very slight expense to change his tire sizes after the truck has been in use. Features and details of the invention will appear from the specification and claims.

A preferred embodiment of the invention is illustrated in the accompanying drawing as follows:—

Fig. 1 shows an elevation of a wheel.

Fig. 2, a plan view of a spoke seat on the wheel center.

Fig. 3, a plan view of a spoke end in place on the wheel center.

Fig. 4, an enlarged section on the line 4—4 in Fig. 1 showing a dual rim mounting.

Fig. 5, an enlarged section on the line 5—5 in Fig. 1.

Fig. 6, a sectional view showing the spoke adapted to an alternative form of rim with a dual mounting.

Fig. 7, a sectional view showing the spoke adapted to receive a single rim.

1 marks the wheel center which includes the hub and is provided at intervals around its periphery with spoke seats 2. Spokes 3 are secured on these seats by means of radially extending screws 4, the screws extending through an axially extending portion of the spoke into the spoke seats. The inboard sides of the spokes are provided with rim supporting portions 5. These portions 5 have the rear beveled seats 6. The front, or out-board sides of the spokes are provided with radially extending rim supporting portions 7, being ordinarily provided with a clamp receiving seat 8. The inboard rim 9 has the usual seat 10 engaging the beveled seat 6. A spacer ring 11 operates against the out-board edge of the rim 9 and is alined by alining shoulders 12 extending circumferentially around the spoke ends, this shoulder operating in connection with the ring. This shoulder prevents an outward movement of one part of the rim, consequently the in-board rim, and, therefore, prevents an inward movement of any other portion of the rim when uneven clamping action takes place. The out-board rim 13 has the usual beveled seat 14 and its inner edge engages the ring 11. Beveled clamps 15 engage the beveled seats 14 and also the seats 8. The clamps have inward projections 16 engaging the faces of the spokes and screws 17 are provided for setting up the clamps.

The spokes are preferably provided with ribs 3a which extend into circumferentially extending grooves 2a in the seats 2. These definitely adjust, or locate the spokes in alinement about the wheel center and also the seating surfaces on the spokes in alinement with planes at right angles to the axis. The seats 2 are preferably flat so that with any driving action on the spokes there is a tendency to wedge the spoke between the rim and this flat seating surface. In other words, the driving strains on the rims do not tend to loosen the spokes, but on the contrary tend to tighten them.

I have shown in dotted lines in Fig. 5 a spoke end of slightly larger diameter and with a rim designed to receive a tire of smaller cross dimension, but with an equal diameter of tread. It will be seen that to adapt the wheel for this change it is only necessary to remove the original spokes and provide longer spokes.

The structure in Fig. 6 is substantially similar in every respect to that in Figs. 1 to 5 with the exception that the details of the seats are slightly changed and the space occupied by the spacing ring is slightly changed to adapt the spokes to a different type of rim. Here again in dotted lines I have shown a slightly longer spoke showing the adaptation of the wheel to a rim for a slightly different size tire.

In Fig. 7 the same wheel center is shown. It is provided with spokes 19 secured by radially extending screws 20, these screws being placed in the same relation to the wheel center as in the other structures. The spokes have rim supporting extensions on which there are tapered seats 21 adapted to receive the tapered seat 22 of the rim 22a. Clamps 23 operate against the face of the rim and are set up by means of screws 24. I have shown here also in dotted lines the change to a slightly longer spoke to adapt it to a change in tire structure, or size.

What I claim as new is:—

1. In a wheel, the combination of a wheel center having spoke seats at intervals throughout the circumference; separate detachable spoke units secured on said seats and forming the supporting structure of the wheel throughout an entire peripheral zone of the wheel structure, said spoke units having radially faced rim-receiving seats adapted to directly engage a radially faced wall of a rim; a detachable pneumatic tire rim having a beveled seating surface seated on said rim-receiving seats; and removable rim securing means on the spoke units operative for rim removal with the spoke units in fixed position on the spoke seats.

2. In a wheel, the combination of a wheel center having spoke seats at intervals throughout the circumference; separate detachable spoke units secured on said seats and forming the supporting structure of the wheel throughout an entire peripheral zone of the wheel structure, said spoke units having beveled rim-receiving seats adapted to directly engage a beveled seating surface on the rim; a detachable pneumatic tire rim having a beveled seating surface seated on said rim-receiving seats; and removable rim securing means on the spoke units comprising clamps operative for forcing a seated rim into clamping engagement by axial movement relatively to the beveled seats on the spoke units.

3. In a wheel, the combination of a wheel center having spoke seats at intervals throughout the circumference, said spoke seats having radially outwardly faced surfaces, the surface of each seat being non-concentric with the wheel center; separate detachable spoke units having radially inwardly faced seats seating on the spoke seats, said spoke units forming the supporting structure of the wheel throughout an entire peripheral zone of the wheel structure; a detachable pneumatic tire rim mounted on said spoke units; and removable rim securing means on the spoke units.

4. In a wheel, the combination of a wheel center having spoke seats at intervals throughout the circumference, said spoke seats having faces in planes at right angles to the spoke radius of each seat; separate detachable spoke units having radially inwardly faced seats secured on said spoke seats and forming the supporting structure of the wheel throughout an entire peripheral zone of the wheel structure; a detachable pneumatic tire rim mounted on said spoke units; and removable rim securing means on the spoke units.

5. In a wheel, the combination of a wheel center having spoke seats at intervals throughout the circumference, said seats having faces in planes at right angles to the spoke radius of said seats; separable detachable spoke units on the seats and in direct alinement with the spokes and forming the supporting structure of the wheel throughout an entire peripheral zone of the wheel structure; radially extending screws extending into the spokes securing each of the spoke units on its seat; a detachable pneumatic tire rim mounted on the ends of the spoke units and removable rim securing means on the spoke units.

6. In a wheel, the combination of a wheel center having spoke seats at intervals throughout the circumference, said seats being radially outwardly faced; separate detachable spoke units having radially inwardly faced seating surfaces on said spoke seats and forming the supporting structure of the wheel throughout an entire peripheral zone of the wheel structure; radially extending screws extending into the spokes securing the spoke units on the seats; a detachable pneumatic tire rim mounted on the ends of the spoke units; and removable rim securing means on the spoke units.

7. In a wheel, the combination of a wheel center having radially outwardly faced spoke seats at intervals throughout the circumference; separate detachable spoke units having axially extending securing portions and radially extending rim securing portions, said spoke units having radially inwardly faced surfaces engaging the spoke seats; means securing the securing portions on the seats comprising radially extending screws extending into the spokes and arranged in said axially extending portions; detachable pneumatic tire rims mounted on the ends of the spoke units; and removable rim securing means on the spoke units.

8. In a wheel, the combination of a wheel center having radially outwardly faced spoke seats at intervals throughout the circumference; spoke units comprising axial portions and rim supporting portions extending from the axial portions, said spoke units having beveled seats, said spokes supporting the structure of the wheel throughout an entire peripheral zone of the wheel structure; means including radial screws in the axial portions securing the spoke units on the spoke seats; a rim seated on the beveled seats of the radial portion; and means clamping the rim in place.

JEWELL W. VANDERVEER.